US005787090A

United States Patent [19]

Van Niekerk et al.

[11] Patent Number: 5,787,090

[45] Date of Patent: Jul. 28, 1998

[54] AUDIO DATA SYSTEM WITH A FIRST INFORMATION SUB-CHANNEL, EXTRACTION MEANS FOR EXTRACTING SAID INFORMATION, AND PACKETIZER MEANS FOR SUPPLEMENTING SAID AUDIO IN A SECOND INFORMATION SUB-CHANNEL, AND ATTACHER STATION AND USER STATION FOR USE IN SUCH A SYSTEM

[75] Inventors: Paulus A. W. Van Niekerk; Marnix C. Vlot, both of Eindhoven, Netherlands

[73] Assignee: U.S. Phillps Corporation, New York, N.Y.

[21] Appl. No.: 896,121

[22] Filed: Jul. 17, 1997

Related U.S. Application Data

[63] Continuation of Ser. No. 569,526, Dec. 8, 1995, abandoned.

[30] Foreign Application Priority Data

Dec. 9, 1994 [EP] European Pat. Off. .............. 94203579

[51] Int. Cl.$^{6}$ .................................................... H04L 5/00

[52] U.S. Cl. ................................ 370/522.007; 370/487; 370/498; 455/6.3; 348/473

[58] Field of Search .................................. 370/466, 486, 370/487, 493, 498, 522, 528, 312; 455/3.2, 6.3, 344, 66, 154.1, 158.1, 168.1; 348/460, 473; 340/825.25

[56] References Cited

U.S. PATENT DOCUMENTS

| | | | |
|---|---|---|---|
| 5,150,113 | 9/1992 | Bluthgen | 340/825.3 |
| 5,214,792 | 5/1993 | Alwadish | 455/168.1 |
| 5,491,838 | 2/1996 | Takahisa et al. | 455/66 |
| 5,497,372 | 3/1996 | Nankoh | 455/158.4 |
| 5,515,372 | 5/1996 | Porter | 370/522 |
| 5,548,828 | 8/1996 | Kozaki et al. | 455/161.2 |
| 5,572,194 | 11/1996 | Shiota | 455/186.1 |

FOREIGN PATENT DOCUMENTS

| | | |
|---|---|---|
| 0325325 | 1/1989 | European Pat. Off. . |
| 0561435 | 9/1993 | European Pat. Off. . |

*Primary Examiner*—Hassan Kizou

[57] ABSTRACT

An audio system has an attacher station for attaching to and decoding an audio representation channel, which also has a first auxiliary information sub-channel. A user station is fed by the attacher station through a unidirectional interface and receives the auxiliary information in an application context under control of a user interface for selective displaying. The attacher station extracts the auxiliary information from the channel. The system also has a framework data generator that is instantiatable by information from the information sub-channel, and a framework packetizer fed by the generator for supplementing the audio representation channel on said unidirectional interface in a second auxiliary information sub-channel by packetized and instantiated application information for the user station.

14 Claims, 2 Drawing Sheets

AUDIO DATA SYSTEM WITH A FIRST INFORMATION SUB-CHANNEL, EXTRACTION MEANS FOR EXTRACTING SAID INFORMATION, AND PACKETIZER MEANS FOR SUPPLEMENTING SAID AUDIO IN A SECOND INFORMATION SUB-CHANNEL, AND ATTACHER STATION AND USER STATION FOR USE IN SUCH A SYSTEM

This is a continuation of application Ser. No. 08/569,526, filed Dec. 8, 1995; now abandoned.

BACKGROUND OF THE INVENTION

FIELD OF THE INVENTION

The invention relates to an audio system having an attacher station for attaching to an audio representation channel that is provided with a first auxiliary information sub-channel and for decoding said auxiliary information, and a user station fed by said attacher station through a unidirectional interface for receiving and selective displaying of said auxiliary information in an application context under control of a user interface. A nonlimitative example of such audio system with an attacher station is the radio data system (RDS) that supplements broadcast audio with various types of informations, such as the name of the actual broadcast station or transmitting authority, traffic announcements, and other. The attacher station then is the broadcast receiver. The representation of the audio itself may be analog or digital. Other examples of such audio system are based on the Digital Compact Cassette (DCC) tape system and the Compact Disc (CD) system, where the attacher station is the tape deck or the disc player, respectively. A similar system is feasible for other types of audio sources. In this respect, reference is made to EP-A2-325,325, corresponding US Ser. No. 08/300,002 now U.S. Pat. No. 5,587,979, to Philips and Du Pont Optical, to EP-A1-389,689, corresponding U.S. Ser. No. 07/499,914, now U.S. Pat. No. 5,150,1134 to Philips and Du Pont Optical, and to EP-A2-561,435, corresponding U.S. Ser. No. 08/368,740, (pending) to Polygram and Philips, all of these being herein incorporated publications describe the so-called Interactive Text Transmission System (ITTS). The channel represents a continuous audio stream. It is envisioned that future systems will have a greater transmission capacity for the auxiliary information sub-channel. However, flexibility as based on the wishes of an individual user person is not possible on the level of the source. Moreover, the attacher station may be remote from the user station, which leads to restricted protocol facilities on the unidirectional interface. Furthermore, given the structure of the information sub-channel, hitherto after separating the information from the audio, no further interaction between the information and the audio was possible. A somewhat related situation may be illustrated for the Teletext system: after separating the Teletext information form the video, it cannot be recombined with the video to any degree, inasmuch as the two channels cannot be reconciled.

SUMMARY OF THE INVENTION

Therefore, amongst other things it is an aspect of the present invention to introduce flexibility to the system on the level of the attacher station, so that the system can offer a wider scope for selection and manipulation of the sub-channel information. Now, according to one of its aspects the invention is characterized in that said attacher station comprises extracting means for extracting said auxiliary information from said channel, a framework data generator that is instantiatable by information from said information sub-channel, and framework packetizer means fed by said generator for supplementing said audio representation channel on said unidirectional interface in a second auxiliary information sub-channel by packetized and instantiated application information for said user station. In this way, the application may be personalized for a particular user, or be actualized for a particular situation. The term instantiatable of course means that the application gets the information, so that it becomes another version of the same application.

Advantageously, said system has input select means for selectively feeding said attacher station by one of a plurality of selectable audio source channels. In this way, a single attacher station can be controllably and selectably fed through a generic decoder by various sources, such as a tuner or an audio recorder deck. The application proper and further subsystems then sit behind the decoder, the system allowing for each selected source to supplement the audio by the instantiated information of the application in question.

Advantageously, said user interface is arranged for selective navigating through multiple applications as presentable by said attacher station, in that said user station has an interaction retrocoupler connection for transmitting selectional commands from said user station to said attacher station, and said attacher station comprises a multi-application framework data generator that is instantiatable by said information sub-channel. In this way, a user may navigate through multiple applications that are feasible with the available auxiliary information, without the necessity for massive intrusion into the attacher station hardware. The retrocoupler connection may be realized by a low-volume bus facility that is used otherwise for controlling the attacher station hardware, and would not cost extra: moreover, the user station need not know the meaning of the received control signals on the level of the application. This again means that the control signals may have an extremely limited vocabulary, inasmuch as further control must be effected at the user station. The combination of the multi-application framework data generator and the framework packetizer allow both for selecting among the multiple applications that are feasible as based on the information received in the attacher station, and also to supplement these applications by information that is privy to the attacher station in question. The packetizer can operate according to a straightforward procedure. Of course, a prerequisite is the presence of sufficient information in the sub-channel so that the navigation is feasible in principle. However, it has been found that a complex and intricate application can be based on an extremely limited information stream in the first auxiliary information sub-channel.

The invention also relates to an attacher station and to a user station for use in a system according to the invention. Various further advantageous aspects of the invention are recited in dependent claims.

BRIEF DESCRIPTION OF THE DRAWING

These and other aspects and advantages of the invention will be described hereinafter in detail with reference to the disclosed preferred embodiments, and in particular with reference to the appended FIGS, that show.

DETAILED DISCLOSURE OF PREFERRED EMBODIMENTS

Figure 1:
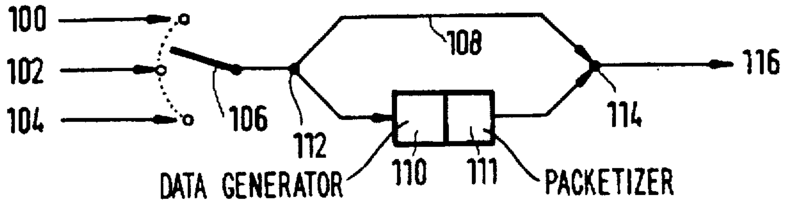
FIG. 1, an elementary system according to the invention.

FIG. 1 shows an elementary system according to the invention, and in particular those aspects that pertain to the attacher station. The audio channel is connected to input 112 of the attacher station. At that point, the information from the information sub-channel is extracted for usage in block 110. Block 110 comprises a framework data generator. Such generator has the data structure of a computer program and contains a definition of the format of an application. Through this framework, the attacher station knows where to look for particular information in the information sub-channel, although the attacher station does not need to know what is the meaning of this information. This particular information is now used for insertion into the application information from the framework data generator, which application thereby becomes instantiated as depending on the content of and the selection from the information sub-channel. The instantiated application information is now fed into a framework packetizer 111. This device formats the information for adherence to an output information sub-channel. By itself, many of such sub.118 channels have been defined and standardized; in fact, it may have the same definition as the sub-channel received on input 112. Through multiplex device 114, the information packets are now recombined in an auxiliary information sub-channel together with the audio that was transferred on line 108. In so doing, the audio may have been converted as well, but this is not necessary. The unidirectional interface is fed to a user station that will be considered more in detail hereinafter. The system of FIG. 1 has three parallel input channels 100, 102, 104. However, a much larger number is feasible, such as in the case of a multiplicity of broadcast stations, or a multiplicity of CD discs in a CD jukebox. The attacher station may select among these through selection means 106. This selecting may be controlled by a user person, or in various different ways by the system. The various channels may have identical dispositions, but their transmission standards may be different as well. In the latter case, the system should either know, or be able to recognize the connected channel, and in consequence, be able to correctly access the information sub-channel in question.

Figure 2:
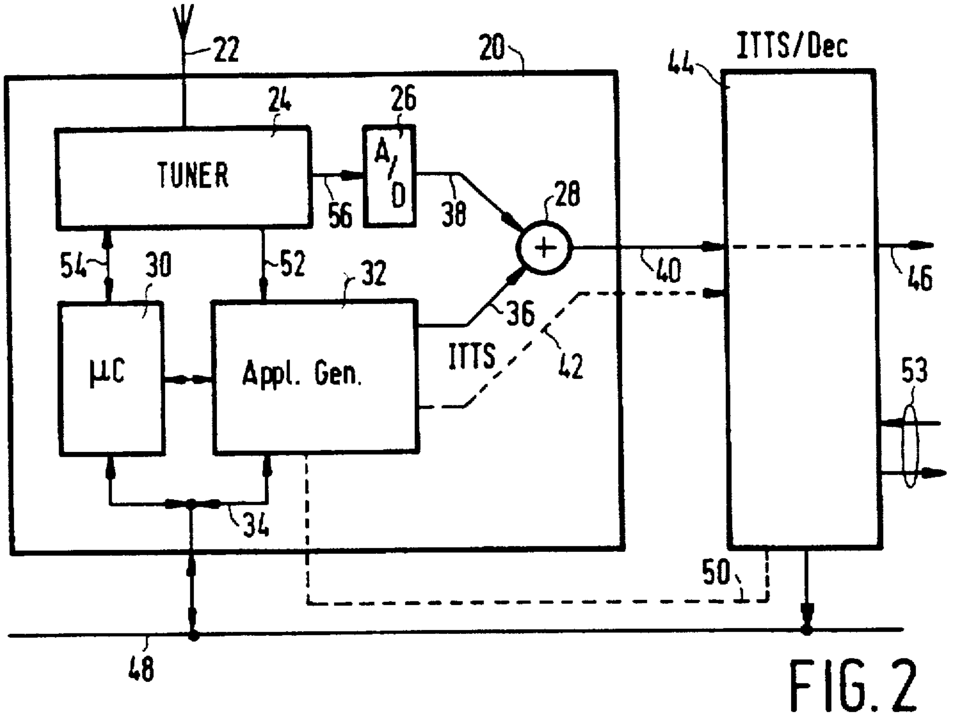
FIG. 2, a system with a digital tuner and an ITTS decoder.

FIG. 2 shows an embodiment of the invention based on a digital tuner for broadcast signals, and a so-called ITTS decoder according to the references supra. As such it builds upon the broadcast oriented version of the prior art, but the present embodiment by itself is understood not to represent a material restriction. The two main subsystems are an emulated digital tuner 20 at left and an ITTS decoder 44 at right. Emulated digital tuner 20 is based on a standard Philips FT930 FM tuner with Radio Data System (RDS) representation capability, and may extract from a broadcast program received, the name of an actual broadcast station, and such other information that is recurrently included in the analog signal. In this respect, the broadcast signal is received on antenna 22, whereas block 24 represents an analog tuner module that contains a MOTOROLA 6805 microcontroller specifically programmed for the RDS decoding that is more specifically disclosed with reference to block 96 in FIG. 4.

Tuner output 52 presents the RDS data packets, output 56 presents analog audio, and via bidirectional connection 54 communicates control signals with a microcontroller 30. This Toshiba TMP47C 1270N microcontroller controls various settings and other features of the tuner, such as controlling the tuner front-end, keyboard, display, EEPROM, and the 6805 RDS decoder, supra. Block 26 is an A/D converter for the audio and outputs a stream of digitized audio samples on line 38, that is an exemplary embodiment of a unidirectional interface.

ITTS decoder 44 at right receives digital information on line 40 according to the standardized IEC958 format. This format has been standardized worldwide for high-volume transport in an audio video environment, cf. Digital Audio Interface 1st Edition, March 1989, Commission electrotechnique Internationale, Geneve, Switzerland. However, this particular standard is only by way of nonlimitative example. The digital information through mixer element 28 comprises the audio derived from line 38, interspersed with the ITTS packets received via line 36. The associated multiplexing has been performed by multiplexing device 28. The IEC 958 format may be used for the main audio channel, but also, or by way of alternative, for the second auxiliary information sub-channel. By itself, this standard format allows for audio transfer, as well as for data transfer. In case of a plurality of sub-channels, their respective formats are in principle independent. Within decoder 44, the ITTS packets are extracted again from the signal stream, whereas the audio, together with the information in the sub-channel, is output on line 46 for further representation, such as for amplification or storage. As such, the latter is irrelevant to the present invention and not discussed further. The ITTS packets are displayed according to the standard ITTS format; accordingly, the user person may want to navigate through the present application or between various applications such as are listed hereinafter. Through the limited capability of the representation facilities at the user station, the user person can use instantaneously only a fraction of the auxiliary information that accompanies the audio data on input 22: on the other hand, according to the invention, random (spatial) accessibility to a certain extent replaces temporal accessibility. For this purpose, ITTS decoder 44 knows a set of Feedback Interactive Commands, which commands may be activated through manual selection on a full or partial keyboard. These commands by itself are more or less trivial to a decoder inside of an application. They send back argument values to the origin site of the application, via bus 48. The application in its turn, reacts thereon. This is straightforward because the command had been packetized earlier at the side of the attacher station itself.

In this respect, item 53 symbolizes a bidirectional user interface. Line 48 represents a low-capacity bus that is conventionally used for transferring control signals for controlling various settings for audio/video parameters in the respective subsystems of such audio/video system. Embodiments may be based on one of the Enhanced Easylink, RS232, or D2B formats, the latter having been published in U.S. Pat. No. 4,429,384 to the present assignee. A further conventional embodiment is that the broadcast station is exchanged for a different station, such as a DCC tape recorder or a CD disc player. The same situation occurs then, in that DCC or CD could carry more auxiliary information than any single application would usefully need.

Block 32 represents an application generator. For each of a series of applications, the generator may produce an application framework. This may be extracted from a ROM store, inasfar as the framework is unalterable. Another realization is that the ROM contains a description of the framework, from which description the various deliverables (image, sound, etc.) may be extracted. Such deliverables are then supplemented or partially replaced by information received by broadcast. Hereinafter a restricted list of presently realizable and foreseeable applications is given:

a. Station preset menu: herein the ITTS can show a menu of options that may be selected, such as a list of preferred or preprogrammed broadcast stations. By means of the retrocoupling, these stations may then be activated in the tuner. In this case, the user station does not need to know specifics of these broadcast stations, such as their respective frequency bands.

b. Mix RDS-to-other conversion application with FITS application from the broadcaster: here, part of the auxiliary information provided by a broadcaster is already in ITTS format. Thereby, the set of feasible applications is broadened, especially if a conversion is executed. One of the applications then functions as an umbrella for the others: if the umbrella application is known, it may convert any information from other applications into ITTS packets.

c. Status display: herein the status of the system can be displayed, such as programmed to a particular broadcast station, freerunning, or operating in a non-broadcast-receiver mode.

d. Radio controlled clock: the broadcast program recurrently carries actual time, that is extracted through the RDS feature and selectively displayed in any of the three standard ITTS formats.

e. Record traffic announcements for later playback: conventionally, such traffic announcements when received are instantaneously represented as speech. According to this particular application, their representation may be suspended until machine-controlled recall occurs, such as at the end of a particular broadcast program section, or until recall by a user person. Through visible signalization, the system may signal that a particular kind of information is 'on hold'.

f. Record this song the next time it is on: for this application, the audio source must provide each musical or other item with a unique identifier.

g. Make traffic information visible on large screen: in ITTS, the displayed information is formatted to 1, 2, or 21 lines of characters. If a television set is used for display, the image may contain even more than 21 lines. However, the TV set does not need to know the ITS-origin of the displayed text.

J. Download program schedule: here, the program schedule of the broadcast station in question after reception is downloaded into local storage for later retrieval or usage.

k. Automatic labelling of recordings: also for this application the audio source must provide each musical or other item with a unique identifier.

l. What's on at the moment: also for this application the audio source must provide each musical or other item with a unique identifier.

Generally, the user person may call up one of the various applications: the associated output is then presented to the user station for display, while allowing subsequent commands by the user person for navigating through the application in question. The application is put to rest either by a terminating command by the user, or by a command to navigate to another of the applications.

Figure 3:
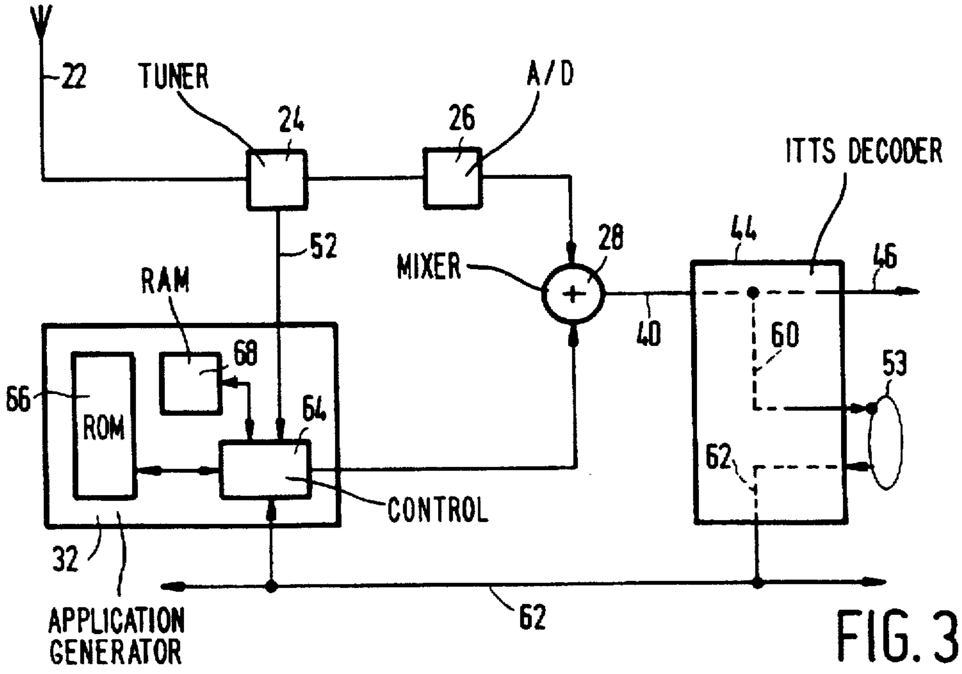
FIG. 3, a data stream diagram relating to FIG. 2.

FIG. 3 shows a data stream diagram relating to the embodiment of FIG. 2. Hardware items 22, 24, 26, 28, 32, 40, 44, 46, 52, 53 have been labelled in correspondence to FIG. 1. Interconnection 52 transfers the split-off RDS auxiliary information to application generator 32. There, control element 64 receives selectional commands via line 62. These call the relevant application from local ROM 66, which application directs what RDS information items should be stored in RAM 68, and subsequently, how the latter should supplement or replace particular information from the application in question to be forwarded via connection 36 and multiplexer 28 to user station 44. There, the information is extracted again for outputting via line 60. Further user control signals may subsequently be specified via line 62.

Figure 4:
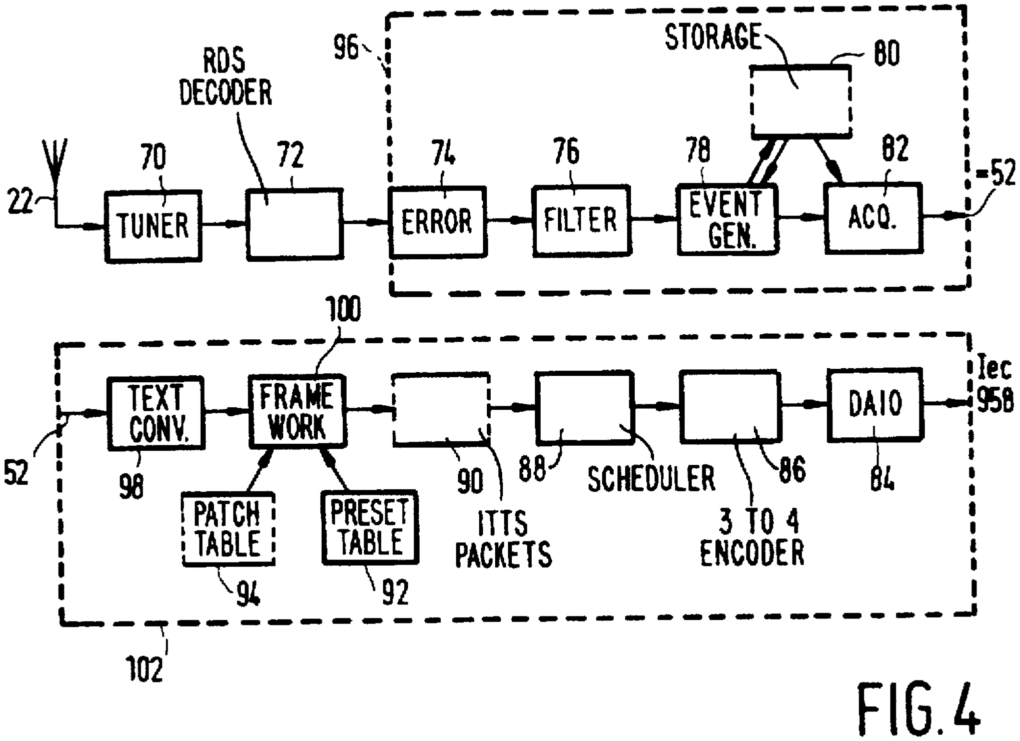
FIG. 4, a detailed version of part of FIG. 3.

FIG. 4 shows a detailed version of part of FIG. 2, in particular the flow of the data through the RDS decoder (part of tuner 24 in FIG. 2) and the RDS to ITTS converter. Audio and control signals have not been shown for clarity. Antenna 22 feeds the tuner 70 with raw broadcast. RDS decoder 72 outputs RDS bits. Inside the 6805 RDS decoder 96, first block 74 executes error synchronizing and error correcting. Block 76 is a filter that only transmits bits that are relevant to the application in question. For example, in stationary usage, the apparatus does not need to know alternative frequencies of the transmitter. Block 78 is an event generator that detects coherence among the sub-channel informations received, such the completion of a particular message structure; the information is thereupon is stored into storage 80. Subsequently, acquisition element 82 reads out store 80, and outputs the data under the I2C protocol on line 52; cf. U.S. Pat. No. 4,689,740 to the present assignee.

RDS to ITTS converter 102 receives I2C data and converts the characters therein to text (block 98): this text must subsequently instantiate the application. Block 94 is a patch table that forms part of ROM 66 in FIG. 2: this specifies the positions in the application framework that must be filled with instantiating data. Block 92 is a preset table that is stored in RAM, preferably in non-volatile RAM, in view of possible modifications. It contains information that is necessary inside an application, but which will not be received from outside. Therefore, it must be inserted into the framework of the application in question. An example is the preset table of a tuner. The output of blocks 92, 94, 98 is combined in patch table block 100 to form the instantiated application framework, and subsequently forwarded to block 90 for the forming or packetizing into ITTS packets. These packets in scheduler 88 are transmitted cyclically. Block 86 is a 3 to 4 encoder that prepares the IEC958-standard-specific information; for brevity, it has not been discussed further. At its output, it provides user data. Block 84 is the well-known Digital Audio In-Out (DAIO) encoder circuit encoder that outputs protocollized IEC 958 data. For brevity, the latter has not been detailed further.

Figure 5:
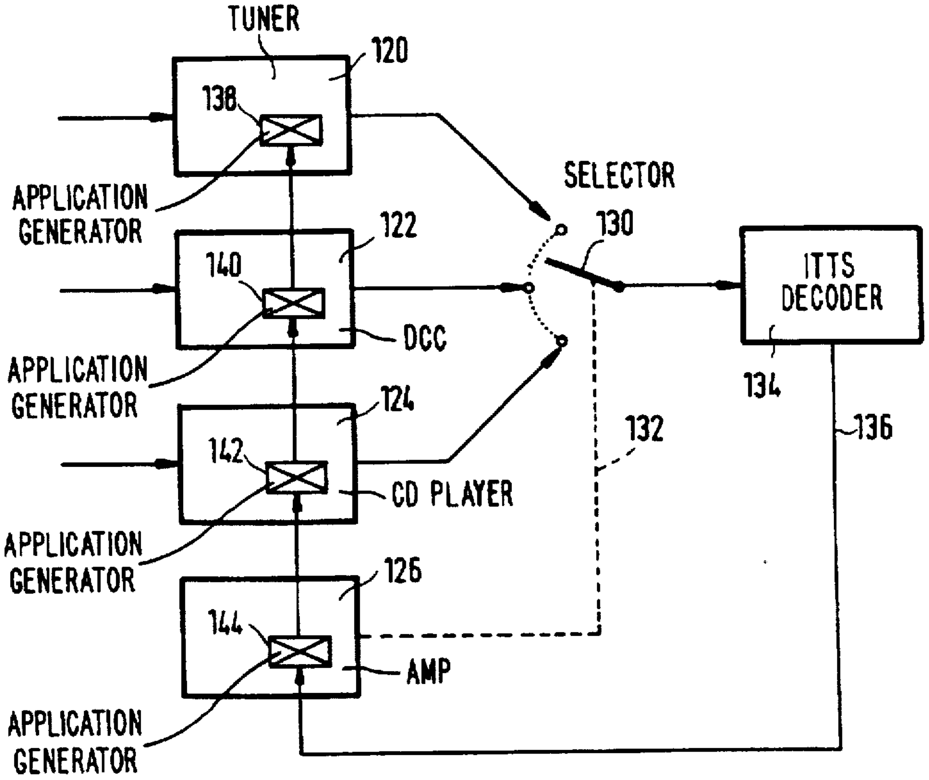
FIG. 5, a system with source selection.

FIG. 5 shows a system according to the invention with source selection. The respective blocks are Tuner 120, Digital Compact Cassette (DCC) deck 122, Compact Disc (CD) Player 124, and Amplifier 126, of which the first three may operate as an audio source that also outputs an information sub-channel. One of these three may be selected by selector 130 for connection to ITTS decoder 134 that is located in block 44 in FIG. 2. ITFS decoder 134 feeds a retrocoupler connection 136 (cf. item 48 in FIG. 2) that in each of the blocks 120, 122, 124, 126 feeds a respective application generator block 138, 140, 142, 144 with selectional commands. Amplifier 126 with local application generator block 144 form a selection signal for selector 130 via line 132. Amplifier block 126 may be located behind user station 44 in FIG. 2. For clarity, the audio paths have not been specified in FIG. 5.

Various other fields of usage of the present invention would now become obvious to the skilled art practitioner:

other members of the CD and DCC family could be used; the audio channel may be part of a television channel at a higher level; the audio source may be an analog Compact Cassette deck; next to data, the information sub-channel may transfer executables and whole applications. Likewise, scripts may be transferred. Applications may be built from elements of a scripting language; commands therefore could emanate from the user station or be produced internally. Furthermore, the object of the applications could be different from the ones discussed supra, such the controlling of the audio system; the object of the application can be the straightout selection of a useful part of all data, such as the data in an RDS environment; generally, through the apparent simplification, as experienced by a user person, of the control of the whole complex audio system, many applications now become feasible that up to now were felt to impose an overly heavy burden on the human operator.

We claim:

1. An audio system having (i) an attacher station for attaching to an audio representation channel including a first auxiliary information sub-channel and for decoding said auxiliary information, and (ii) a user station fed by said attacher station through a unidirectional interface for receiving and selective displaying of said auxiliary information in an application context under control of a user interface, characterized in that: said attacher station comprises extracting means for extracting said auxiliary information from said channel, a framework data generator that is instantiatable by information from said information sub-channel, and framework packetizer means fed by said generator for supplementing said audio representation channel on said unidirectional interface in a second auxiliary information sub-channel by packetized and instantiated application information for said user station.

2. A system as claimed in claim 1, and having input selection means for selectively feeding said attacher station by one of a plurality of selectable audio source channels.

3. A system as claimed in claim 2 wherein said user interface is arranged for selective navigating through multiple applications as presentable by said attacher station, in that said user station has an interaction retrocoupler connection for transmitting selectional commands from said user station to said attacher station, and said attacher station comprises a multi-application framework data generator that is instantiatable by said information sub-channel.

4. A system as claimed in claim 2, wherein said audio is digital audio.

5. A system as claimed in claim 1, wherein said user interface is arranged for selective navigating through multiple applications as presentable by said attacher station, in that said user station has an interaction retrocoupler connection for transmitting selectional commands from said user station to said attacher station, and said attacher station comprises a multi-application framework data generator that is instantiatable by said information sub-channel.

6. A system as claimed in claim 5, wherein said audio is digital audio.

7. A system as claimed in claim 1, wherein said audio is digital audio.

8. A system as claimed in claim 1, wherein said unidirectional interface supports an ITTS protocol.

9. A system as claimed in claim 1, wherein said framework data generator is based on non-volatile memory for in said non-volatile memory storing said applications.

10. A system as claimed in claim 1, wherein said unidirectional interface is IEC958 based.

11. A system as claimed in claim 1, wherein said second auxiliary information sub-channel is IEC958 based.

12. A system as claimed in claim 1, wherein said retrocoupler connection is a bus that is shared among a plurality of stations.

13. An attacher station for use in a system as claimed in claim 1.

14. A user station for use in a system as claimed in claim 1.

* * * * *